Jan. 9, 1934.    J. O. FINK    1,942,691
CLUTCH
Filed July 6, 1931    2 Sheets-Sheet 1
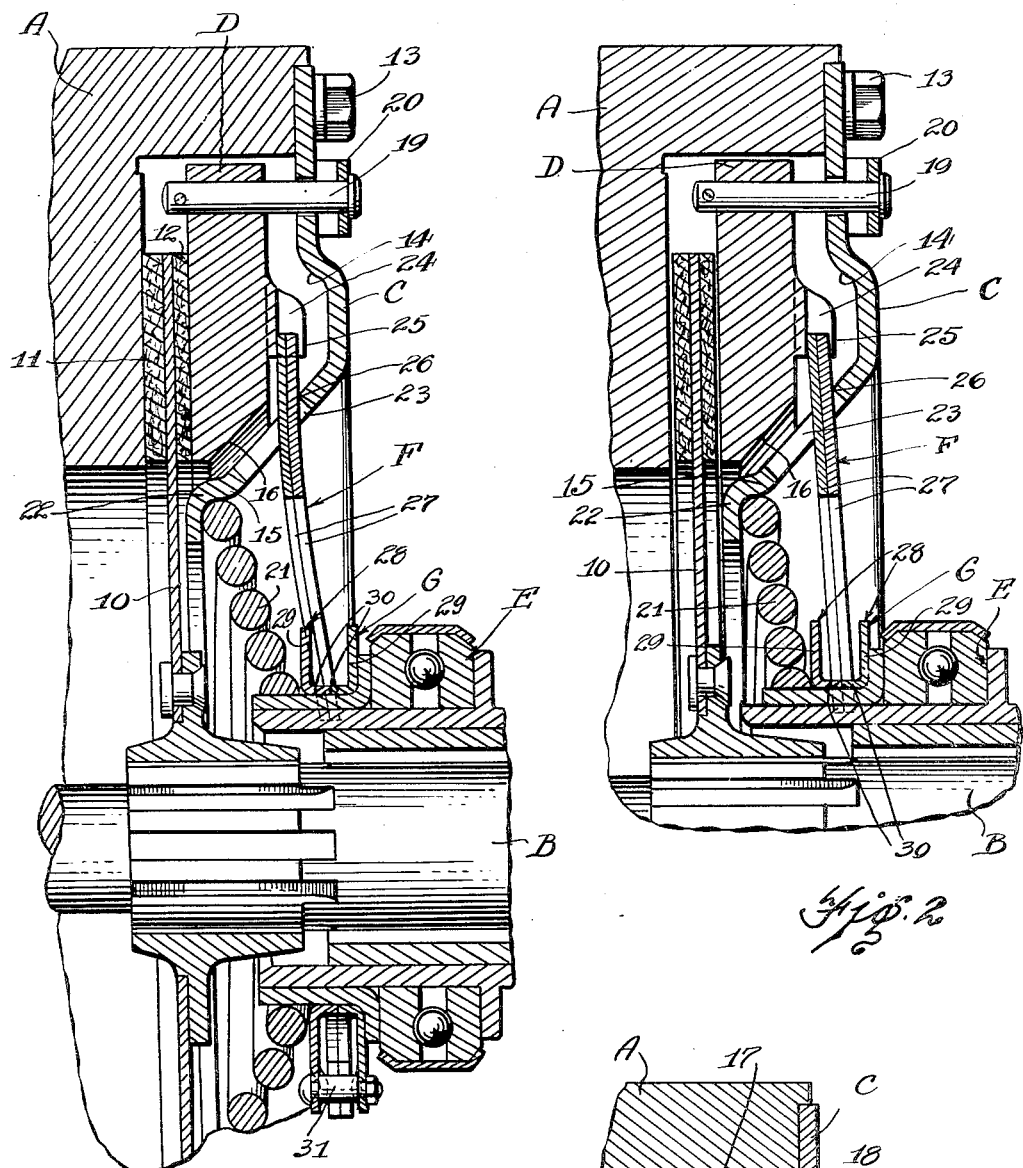
INVENTOR.
James O. Fink
BY 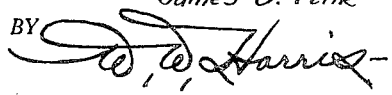
ATTORNEY.

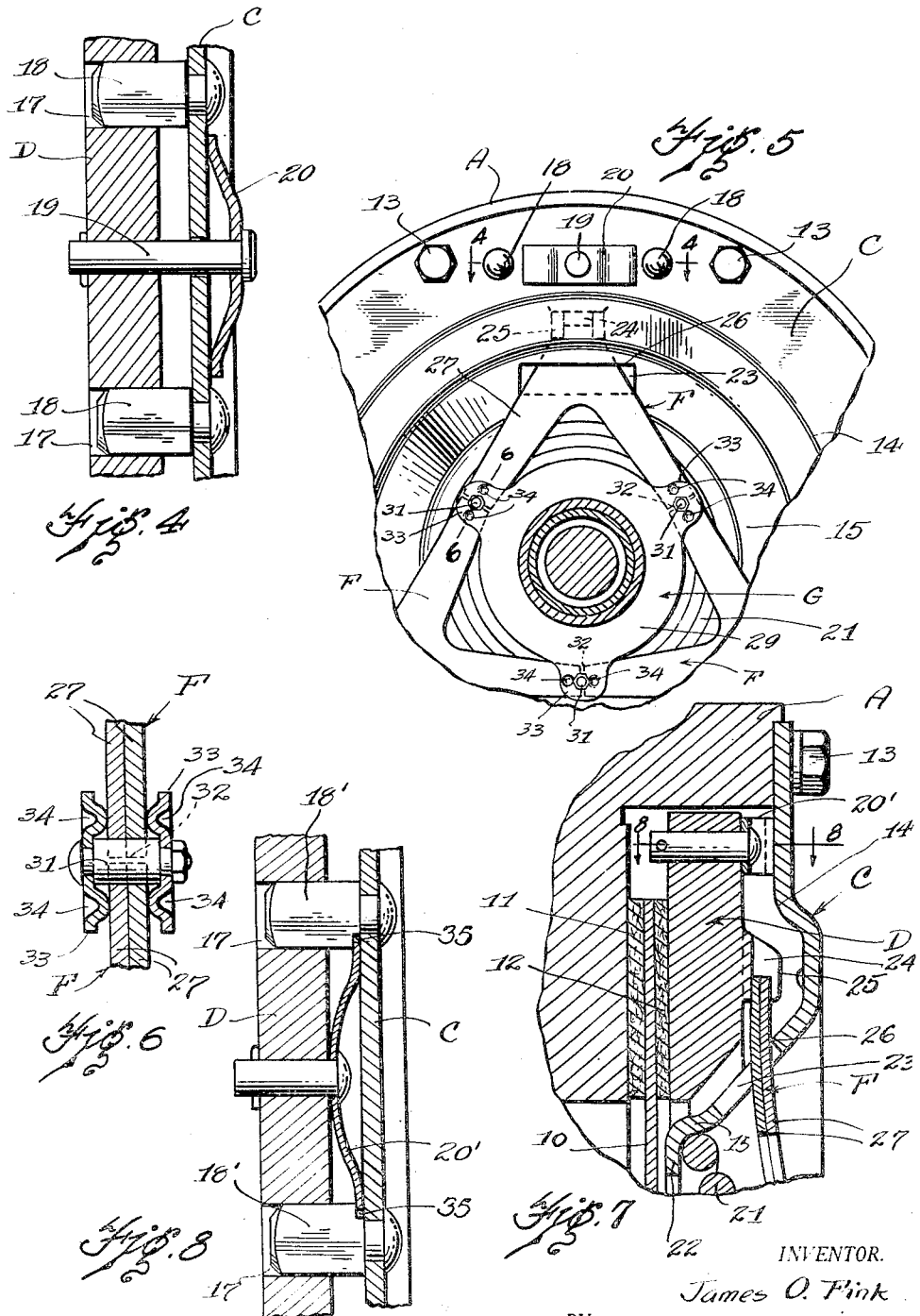

Patented Jan. 9, 1934

1,942,691

UNITED STATES PATENT OFFICE 1,942,691

CLUTCH

James O. Fink, Detroit, Mich., assignor to Continental Motors Corporation, Detroit, Mich., a corporation of Virginia Application July 6, 1931. Serial No. 548,787

14 Claims. (Cl. 192—68)

This invention relates to clutches of the type generally used in the automotive vehicle industry and has among its objects the provision of an improved clutch which will not grab or chatter during engagement.

A further object of the invention resides in the provision of a novel combination and arrangement of parts whereby the clutch is capable of manufacture at considerably less cost than heretofore, my improved clutch eliminating many of the parts heretofore used in clutches while at the same time obtaining an improved clutch action.

Further objects and advantages of my invention will be apparent from the following description of one embodiment of the invention.

Referring to the accompanying drawings:

Fig. 1 illustrates a sectional elevation view through the clutch as assembled with the usual flywheel and driven shaft, Fig. 2 is a sectional detail view illustrating the parts of the clutch when disengaged, Fig. 3 is a detail sectional view showing the drive between the flywheel and pressure plate, Fig. 4 is a detail sectional view along the line 4—4 of Fig. 5 illustrating the pressure plate drive and retracting means, Fig. 5 is a fragmentary rear elevation view of the clutch.

Fig. 6 is a detail sectional view along the line 6—6 of Fig. 5 illustrating the positioning means for the inner ends of the levers, Fig. 7 is a sectional detail view illustrating a slightly modified arrangement of the pressure plate retracting means, and Fig. 8 is a sectional detail view along the line 8—8 of Fig. 7.

In the drawings, reference character A represents the usual engine flywheel or driving member and B is the driven shaft or member, the latter having connected thereto the driven disc 10 having friction surfaces 11, 12 preferably of the plane face type. If desired these friction surfaces or mats 11, 12 may be of the well known warped or distorted form although one feature or my invention resides in the provision of a clutch operating mechanism which will not necessitate such distorted mats with the consequent elimination of spot wearing and the provision of a clutch disc which will operate efficiently over relatively long periods of use.

C is the cover plate attached to and driven by flywheel A by reason of the fastening devices 13, this cover being of substantially reversed curvature whereby it opens inwardly of the clutch by reason of the cupped portion 14 and outwardly of the clutch by reason of the cupped portion 15, the latter portion preferably being integral with the portion 14 and extending inwardly of the clutch within the annular opening 16 of the pressure plate or driving means D. In this manner the cover plate C overlaps the pressure plate D axially of the driven shaft B or in other words the pressure plate and cover plate are telescoped.

The pressure plate D is driven from the flywheel by reason of plate recesses 17 engaged by driving lugs 18 carried by cover C as shown in Figs. 3 and 4, the pressure plate being movable axially of shaft B during said drive. Extending through the pressure plate at suitable points transversely of the clutch are retracting pins 19 urged outwardly by springs 20 engageable on the outside of cover C in the form illustrated in Fig. 1. These springs 20 merely insure disengagement of the pressure plate relative to the driven disc 10 when the clutch is disengaged.

Slidably mounted on shaft B is a collar or clutch releasing means E, this collar being urged outwardly by reason of the spring means 21 acting between the collar and the abutment 22 formed by the portion of the cover C which is located within recess 16. In the illustrated embodiment of my invention the spring means 21 is shown in the form of a tapered coil spring merely for purposes of illustration. The form of spring illustrated however, is one feature of my invention in combination with the general clutch arrangement since it provides for further simplicity and elimination of parts.

The cover C is provided with a plurality of openings 23 for receiving the lever assemblies F which have their inner ends around the shaft B and the outer ends located in slots 24 of lugs 25 formed on the outer face of pressure plate D. A fulcrum 26 is conveniently provided for each of the levers at the edge of openings 23.

The lever assemblies F in the illustrated embodiment of my invention are formed by a plurality of laminated spring steel sections 27 whereby these levers are capable of bending in order to transmit a uniformly increasing load from spring 21 to the pressure plate during clutch engagement, this load increasing from substantially zero pressure at the initial clutch engagement to the desired full pressure when the clutch is fully engaged. Referring to Fig. 2 it will be noted that these levers are substantially straight or unflexed when the clutch is disengaged and in this position when the collar E is moved to the right in the usual manner, the levers will move the pressure plate toward the driven disc 10 for engagement therewith under substantially zero pressure. As the collar E is further released to the right the levers will be flexed whereby their inner ends will be moved over a relatively great distance with respect to the outer ends as the levers yieldingly build up pressure from spring 21.

One important feature of my invention resides in the manner in which the inner ends of the forked lever assemblies F are positioned with respect to the collar E. Thus as best shown in Figs. 1, 5 and 6 the collar E carries the lever positioning means or assembly G which is preferably composed of a pair of stampings 28 each having radially extending annular flanges 29 and flanges 30 at right angles with flanges 29 to space flanges 29 as illustrated to form a substantially U-shaped annular recess receiving the inner ends of the levers. Across flanges 29 which are referred to as the legs of the U are located at spaced points circumferentially of shaft B, the pins 31, and the lever ends are formed with recesses 32 for engagement around these pins. Adjacent levers have their adjacent forked ends recessed in complementary fashion whereby an adjacent pair substantially surrounds each pin 31. The flanges 29 in the vicinity of pins 31 are formed with outer projections 33 for receiving these pins and by referring to Fig. 6 it will be noted that these projections are indented inwardly toward each other at 34 to provide abutments engaging the levers whereby the latter will be positioned for the slide rocking action desired for their aforesaid movement.

Referring to Figs. 7 and 8 the parts illustrated are similar to the previous parts described with the exception that the springs 20' are located on the inner side of the cover C instead of on the outside as illustrated in Fig. 1. The ends of spring 20' are conveniently located within slots 35 provided in driving lugs 18' as illustrated in Fig. 8.

To release or disengage the clutch, the clutch releasing means E is actuated or moved into the position shown in Fig. 2 compressing the spring 21 thereby permitting yielding means 20 to retract the pressure plate D. On retracting the clutch releasing means E the load of the spring 21 first tends to engage the clutch driving and driven means with a minimum of pressure (zero pressure) and then to flex the lever means F and build up the pressure between the clutch driving and driven means until the full load is applied as illustrated in Fig. 1. The yielding or spring lever means serves to transmit progressively increasing pressure to the pressure plate or driving means D from zero pressure at the time of initial engagement of said driving and driven means throughout the range of clutching action.

What I claim as my invention is:

1. In a clutch the combination of a driving flywheel and driven shaft, a pressure plate driven by the flywheel, a disc connected with the driven shaft and engageable with the flywheel, a cover plate mounted on the flywheel and extending inwardly toward the pressure plate, said cover plate having openings therethrough, levers adapted to move the pressure plate and having their ends directed toward said shaft, lever actuating means slidable on said shaft, said levers extending through and fulcrumed by said cover plate openings.

2. In a clutch the combination of a driving flywheel and driven shaft, a pressure plate driven by the flywheel, a disc connected with the driven shaft and engageable with the flywheel, a cover plate mounted on the flywheel and extending inwardly toward the pressure plate, said cover plate having openings therethrough, levers adapted to move the pressure plate and having their ends directed toward said shaft, lever actuating means slidable on said shaft, said levers extending through and fulcrumed by said cover plate openings, and yielding means intermediate the lever actuating means and said inwardly extending portion of the cover plate.

3. In a clutch the combination of a driving flywheel and driven shaft, a pressure plate driven by the flywheel, a disc connected with the driven shaft and engageable with the flywheel, a cover plate mounted on the flywheel and extending inwardly toward the pressure plate, said cover plate having openings therethrough, levers adapted to move the pressure plate and having their ends directed toward said shaft, lever actuating means slidable on said shaft, said levers extending through and fulcrumed by said cover plate openings, and a tapered coil spring intermediate the lever actuating means and said inwardly extending portion of the cover plate.

4. In a clutch the combination of a driving flywheel and driven shaft, a pressure plate driven by the flywheel and having a central opening surrounding said driven shaft, a disc connected with the driven shaft and engageable with the flywheel, a cover plate carried by the flywheel and telescoped within the pressure plate opening, lever means for actuating the pressure plate, lever releasing means on said shaft, and spring means intermediate the releasing means and cover plate, said spring means extending forwardly from the releasing means toward said disc, said lever means being fulcrumed by said cover plate and having an outer end substantially housed between the cover plate and pressure plate.

5. In a clutch the combination of a driving flywheel and driven shaft, a pressure plate driven by the flywheel, a disc connected with the driven shaft and engageable with the flywheel, a reversely cupped cover plate carried by the flywheel, levers adapted to actuate the pressure plate and fulcrumed at an intermediate point through the cover plate, and yielding means intermediate the cover plate and lever ends tending to actuate the pressure plate, the outer end of said levers being substantially housed between the cover plate and pressure plate.

6. In a clutch the combination of a driving flywheel and driven shaft, a pressure plate driven by the flywheel and having a central opening surrounding said driven shaft, a disc connected with the driven shaft and engageable with the flywheel, a reversely cupped cover plate carried by the flywheel, levers adapted to actuate the pressure plate and fulcrumed at an intermediate point through the cover plate, and yielding means intermediate the cover plate and lever ends tending to actuate the pressure plate, said cover plate having an abutment portion telescopically associated within said pressure plate opening.

7. In a clutch the combination of a driving flywheel and driven shaft, a pressure plate driven by the flywheel, a disc connected with the driven shaft and engageable with the flywheel, a cover plate mounted on the flywheel and extending inwardly toward the pressure plate, said cover plate having openings therethrough, laminated levers adapted to move the pressure plate and having their ends directed toward said shaft, lever actuating means slidable on said shaft, said laminated levers extending through and fulcrumed by said cover plate openings.

8. In a clutch the combination of a driving flywheel and driven shaft, a pressure plate driven by the flywheel, a disc connected with the driven shaft and engageable with the flywheel, levers driven by the flywheel and surrounding said shaft, yielding means for moving said pressure plate, lever positioning means surrounding said shaft and being substantially U-shaped in cross-section with the legs of the U extending generally radially of said shaft, said levers having their ends located in said U-shaped positioning means, and pins spaced around said shaft and extending across said U-legs, said U-legs having portions extending inwardly thereof, said levers having their ends bearing on said pins and against said inwardly extending portions.

9. In a clutch the combination of a driving flywheel and driven shaft, a pressure plate driven by the flywheel, a disc connected with the driven shaft and engageable with the flywheel, levers driven by the flywheel and surrounding said shaft, yielding means for moving said pressure plate, lever positioning means surrounding said shaft and being substantially U-shaped in cross-section with the legs of the U extending generally radially of said shaft, said levers having their ends located in said U-shaped positioning means, and pins spaced round said shaft and extending across said U-legs, said U-legs having portions extending inwardly thereof, said levers having their ends recessed for bearing on said pins and against said inwardly extending portions.

10. In a clutch the combination of a driving flywheel and driven shaft, a pressure plate driven by the flywheel, a disc connected with the driven shaft and engageable with the flywheel, levers driven by the flywheel and surrounding said shaft, yielding means for moving said pressure plate, lever positioning means surrounding said shaft and being substantially U-shaped in cross-section with the legs of the U extending generally radially of said shaft, said levers having their ends located in said U-shaped positioning means, and pins spaced round said shaft and extending across said U-legs, said U-legs having portions extending inwardly thereof, said levers having their ends forked for engagement with a plurality of said pins.

11. In a clutch, driving means, driven means, driving and driven members respectively connected in driving relation with said driving and driven means, a cover plate fixed to said driving means and having an inner flange portion extending towards said driving member, said flange portion having openings therethrough, and levers acting on said driving member and extending through and fulcrumed by said cover plate openings.

12. In a clutch, driving means, driven means, driving and driven members respectively connected in driving relation with said driving and driven means, a cover plate fixed to said driving means and having an inner flange portion extending towards said driving member, said flange portion having openings therethrough, and levers acting on said driving member and fulcrumed by said cover plate, said levers extending through said openings and having their outer ends substantially housed intermediate the cover plate and driving member.

13. In a clutch, driving means, driven means, driving and driven members respectively connected in driving relation with said driving and driven means, a cover plate fixed to said driving means and having an inner flange portion extending towards said driving member, said flange portion having openings therethrough, and spring levers acting on said driving member and extending through and fulcrumed by said cover plate openings.

14. In a clutch, driving means, driven means, driving and driven members respectively connected in driving relation with said driving and drven means, a cover plate fixed to said driving means and having an inner flange portion extending towards said driving member, said flange portion having openings therethrough, spring levers acting on said driving member and extending through and fulcrumed by said cover plate openings, said levers extending substantially towards said driven means, and yielding means acting between said cover plate and the inner ends of said spring levers.

JAMES O. FINK.